United States Patent [19]
Mussell et al.

[11] Patent Number: 5,882,810
[45] Date of Patent: *Mar. 16, 1999

[54] ACTIVE LAYER FOR MEMBRANE ELECTRODE ASSEMBLY

[75] Inventors: Robert D. Mussell, Midland, Mich.; Timothy J. Rehg, Huntington Beach, Calif.

[73] Assignee: The Dow ChemicalCompany, Midland, Mich.

[ * ] Notice: The term of this patent shall not extend beyond the expiration date of Pat. No. 5,702,755.

[21] Appl. No.: 813,773

[22] Filed: Mar. 7, 1997

Related U.S. Application Data

[60] Provisional application No. 60/013,050 Mar. 8, 1996.
[51] Int. Cl.⁶ .................................................. H01M 8/10
[52] U.S. Cl. .......................... 429/33; 429/30; 429/40; 429/41; 429/42; 204/282; 204/296
[58] Field of Search ................... 429/30, 33, 40, 429/41, 42; 204/296, 282

[56] References Cited

U.S. PATENT DOCUMENTS

| | | | |
|---|---|---|---|
| 3,282,875 | 11/1966 | Connolly et al. | 260/29.6 |
| 4,215,183 | 7/1980 | MacLeod | 429/30 |
| 4,329,435 | 5/1982 | Kimoto et al. | 521/38 |
| 4,330,654 | 5/1982 | Ezzell et al. | 526/243 |
| 4,337,137 | 6/1982 | Ezzell | 204/252 |
| 4,337,211 | 6/1982 | Ezzell et al. | 260/456 |
| 4,358,412 | 11/1982 | Ezzell et al. | 260/968 |
| 4,358,545 | 11/1982 | Ezzell et al. | 521/27 |
| 4,417,968 | 11/1983 | Ezzell et al. | 204/252 |
| 4,462,877 | 7/1984 | Ezzell | 204/98 |
| 4,469,579 | 9/1984 | Covitch et al. | 204/283 |
| 4,470,889 | 9/1984 | Ezzell et al. | 204/98 |
| 4,478,695 | 10/1984 | Ezzell et al. | 204/98 |
| 4,515,989 | 5/1985 | Ezzell et al. | 568/674 |
| 4,578,512 | 3/1986 | Ezzell et al. | 562/586 |
| 4,940,525 | 7/1990 | Ezzell et al. | 204/252 |
| 5,171,644 | 12/1992 | Tsou et al. | 429/12 |
| 5,211,984 | 5/1993 | Wilson | 427/115 |
| 5,234,777 | 8/1993 | Wilson | 429/33 |
| 5,330,860 | 7/1994 | Grot et al. | 429/42 |
| 5,514,486 | 5/1996 | Wilson | 429/30 |
| 5,521,020 | 5/1996 | Dhar | 429/142 |
| 5,620,807 | 4/1997 | Mussell et al. | 429/33 |
| 5,702,755 | 12/1997 | Mussell | 429/42 |

FOREIGN PATENT DOCUMENTS

| | | |
|---|---|---|
| 0 064 389 | 11/1982 | European Pat. Off. . |
| 0 560 295 | 9/1993 | European Pat. Off. . |
| 0 577 291 | 1/1994 | European Pat. Off. . |
| 0 629 015 | 12/1994 | European Pat. Off. . |
| 0 687 023 | 12/1995 | European Pat. Off. . |
| 0 718 903 | 6/1996 | European Pat. Off. . |
| 61 052 383 | 7/1986 | Japan . |
| 6-260185 | 9/1994 | Japan . |
| 6-333574 | 12/1994 | Japan . |
| WO94/05049 | 3/1994 | WIPO . |
| 94/25993 | 11/1994 | WIPO . |
| WO96/12316 | 4/1996 | WIPO . |

OTHER PUBLICATIONS

Chemical Abstract No. 14273q, vol. 105, No. 2 (1986) no month available.

Extended Abstracts Fall meeting 1995, Oct. 8/13, St. Louis, Missouri, vol. 95/2, pp. 1043–1044.

Springer, T. E. et al., "Modeling and Experimental Diagnostics in Polymer Electrolyte Fuel Cells", J. Electrochem. Soc., vol.140, No. 12 (Dec. 1993).

Patent Abstracts of Japan, JP 61 052 383,vol. 10, No. 214 (Jul. 25, 1986).

Murphy, O. J. et al., Journal of Power Sources, vol. 47, No. 3, pp. 353–368 (194) no month available.

Uchida, M. et al., J. Electrochem Soc., vol. 142, No. 2, pp. 463–468 (Feb. 1995).

*Primary Examiner*—Bruce F. Bell

[57] ABSTRACT

Described is a membrane electrode assembly having an ion exchange membrane, and at least two active layers positioned on the same side of the membrane; wherein the active layers containing catalytically-active particles and an ionomer; the average equivalent weights of the ionomers in the layers differ by at least 50; and the active layer positioned closest to the membrane contains the ionomer with the lower average equivalent weight. This membrane electrode assembly, when utilized in a fuel cell, provides a relatively high voltage at a given current density and gas flow rate.

25 Claims, 3 Drawing Sheets

ACTIVE LAYER FOR MEMBRANE ELECTRODE ASSEMBLY

CROSS REFERENCE TO RELATED APPLICATION

This application claims the benefit of U.S. Provisional Application No. 60/013,050, filed Mar. 8, 1996.

BACKGROUND OF THE INVENTION

This invention relates to a membrane and electrode structure composed of an ion exchange membrane having a plurality of electrically-conductive, catalytically-active particles present on one, or both, surfaces of an ion exchange membrane. These membrane and electrode structures are particularly useful in fuel cells and electrolytic cells.

It is known to prepare membrane and electrode structures by depositing a catalyst ink comprising catalytically-active particles, a suspension medium comprising a hydrocarbon having an ether, epoxy, or ketone linkage and an alcohol group, and a binder, onto a solid polymer electrolytic material such as a polymeric membrane as described, for example, in U.S. Pat. No. 5,330,860. U.S. Pat. No. 5,234,777 describes solid polymer electrolyte membrane assemblies consisting essentially of a solid polymer electrolyte membrane and a composite film of a supported platinum catalyst and a proton-conducting ionomer with a thickness less than about 10 $\mu$m and a platinum loading of less than about 0.35 mg Pt/cm$^2$. Japanese Patent Application No. H6-260185 discloses a gas diffusion electrode prepared from a perfluorosulfonate polymer having an equivalent weight of at least 950. However, the performance of such structures in a proton exchange membrane fuel cell may be less than desirable for certain fuel cell applications.

SUMMARY OF THE INVENTION

In one aspect, this invention is a membrane electrode assembly having an ion exchange membrane, and at least two active layers positioned on the same side of the membrane; wherein the active layers comprise catalytically-active particles and an ionomer; the average equivalent weights of the ionomers in the layers differ by at least 50; and the active layer positioned closest to the membrane (hereafter, the "first" active layer) contains the ionomer with the lower average equivalent weight. The "second" active layer (the layer positioned on the side of the first active layer which is opposite to the side facing the membrane) may either be positioned adjacent to and in contact with the first active layer, or one or more additional active layers may be positioned between the first and second active layers.

In a second aspect, this invention is a membrane electrode assembly having an ion exchange membrane, and at least one active layer positioned on one side of the membrane; wherein the active layer comprises (a) catalytically-active particles, and (b) an ionomer having an equivalent weight of less than 950 and which is substantially insoluble in water at temperatures of less than 100° C.

In a third aspect, this invention is a composition comprising (a) catalytically-active particles, (b) an organic compound, and (c) an ionomer having an equivalent weight of less than 950 and which, following removal of component (b) from the composition, is substantially insoluble in water at temperatures of less than 100° C.

It has been discovered that the membrane electrode assembly ("MEA") of the invention, as well as MEAs prepared from the compositions of the second and third aspect of the invention, when utilized in a fuel cell, provide a relatively high voltage at a given current density and gas flow rate. Typically, in a fuel cell, the membrane and active layer must be hydrated in order to be sufficiently ionically conductive. During operation of the fuel cell, water is formed on the cathode side of the membrane, which condenses within the adjacent porous carbon material serving as a backing layer or flow field. Water may also be present in the fuel cell due to the humidification of one or both of the reactant gases. However, if too much water condenses or otherwise accumulates adjacent to the active layer, the efficiency of the fuel cell is reduced, since diffusion of gas through liquid is slow relative to its diffusion through water vapor.

The equivalent weight of the ionomer is believed to affect the water content of the active layer. It is believed, without intending to be bound, that the lower equivalent weight ionomer maintains a higher water content at low current densities. This higher water content improves the proton conductivity and the accessibility of the catalytically active particles, thereby increasing the voltage. However, this increase in water content can lower the performance (voltage) at higher current densities. It has been discovered that the performance at both high and low current densities may be optimized by using a multi-layer active layer with a different equivalent weight ionomer in each layer. It is believed, without intending to be bound, that the improved performance results from the differences in hydrophilicity between the layers. The lower equivalent weight ionomer adjacent to the membrane is believed to provide an area within the MEA having a high water content, for better performance at low current densities, while the less hydrophilic higher equivalent weight ionomer helps transport water away from the membrane at higher current densities. In the second and third aspect of the invention, the use of a relatively low equivalent weight ionomer gives better performance at lower current densities. These and other advantages of the invention will be apparent from the description which follows.

DETAILED DESCRIPTION OF THE INVENTION

Figure 1:
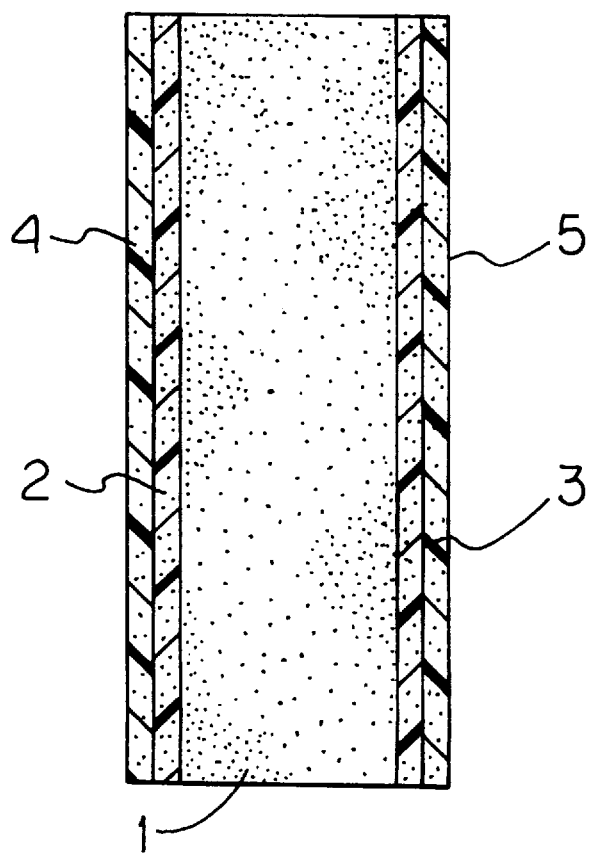
FIG. 1 illustrates a membrane electrode assembly having two active layers positioned on the same side of the membrane.

The MEAs of the invention may be prepared by any suitable technique. In one technique, a layer of a catalyst "ink" is first applied to a solid polymer electrolyte, a carbon fiber paper, or a release substrate. The ink comprises catalytically-active particles, and at least one compound which functions as an ionomer. The ink also preferably contains an organic solvent or dispersing aid which permits the application of a thin, uniform layer of the catalyst/ionomer mixture to the solid polymer electrolyte, carbon fiber paper, or release substrate. To prepare the MEA of the first aspect of the invention, a layer of a second ink is then applied to the portion of the MEA located opposite the first active layer or to a release substrate, or on top of the first active layer. Additional layers of the same or different inks may be applied before or after the application of the ink which will form the "second" active layer. The term "active layer" as used herein refers to a layer comprising a mixture of ionomer and catalytically-active particles.

If the ink from which the second active layer is prepared is applied on top of the first active layer, the first active layer is preferably first dried sufficiently before application of the second ink to prevent too much mixing of the inks. However, a minor degree of mixing of the inks at their point of contact with each other may be desirable since it will promote electrical and ionic conductivity between the active layers. After the inks have been applied, they are preferably heated under conditions sufficient to volatilize at least 95 percent of any organic solvent or dispersing aid present in the inks. Preferably, the MEA is prepared by applying one or more layers of the catalyst ink (which is preferably the composition of the invention) directly to the solid polymer electrolyte as described, for example, in U.S. Pat. No. 5,211,984. The term "solid polymer electrolyte" as used herein refers to a membrane comprised of a solid polymer which has a conductivity of at least about $1 \times 10^{-3}$ Siemens/cm (S/cm) under the operating conditions of the fuel cell or electrolytic cell, or which may be reacted with acid or base to generate a membrane having such conductivity. Preferably, the solid polymer electrolyte comprises a film of a sulfonated fluoropolymer, or a layered composite of films of sulfonated fluoropolymers having different equivalent weights.

Another method for preparing the MEA comprises applying one or more layers of the catalyst ink to a release substrate, such as a material coated with polytetrafluoroethylene (available from DuPont as Teflon™), curing the ink, and then laminating the cured ink layers to the membrane. A third method comprises applying one or more layers of the catalyst ink to one side of a sheet of porous carbon material, such as a carbon or graphite paper, and then placing the side of the material to which the ink was applied adjacent to the membrane. In this method, the porous carbon material remains attached to the assembly and becomes part of the electrochemical device. If the ink is cured before being placed next to the membrane, it should then preferably be laminated to the membrane to ensure good contact between the two.

The ink layers may be cured using any suitable method for removing at least 95 percent of organic solvent or dispersing aid, as well as any other volatile organic solvents contained in the ink, such as by heating at an elevated temperature optionally under reduced pressure. Preferably, the ink is heated to a temperature at which the organic solvent or dispersing aid is volatile, but below its boiling point. If more than one ink is used to prepare the active layer of the MEA, the layer of ink closest to the membrane has an equivalent weight which differs from the equivalent weight of the ionomer in the ink layer adjacent thereto by at least 50. Further, the layer having the lowest equivalent weight ionomer is preferably positioned adjacent to the solid polymer electrolyte.

Preferably, the ink is heated under conditions sufficient to remove enough of the organic solvent or dispersing aid so that the active layer comprises at least 99 percent by weight, more preferably at least 99.9 percent by weight of the mixture of catalytically-active particles and the ionomer. The ink is applied in an amount sufficient to provide a layer of the composition which has a thickness of at least 1 $\mu$m, more preferably at least 5 $\mu$m, and most preferably at least 10 $\mu$m; but is preferably no greater than 30 $\mu$m. The porosity of the layer is preferably at least 30 percent, more preferably at least 50 percent; but is preferably no greater than 90 percent, more preferably no greater than 60 percent. The mean pore size of the layer is preferably at least 0.01 $\mu$m, more preferably at least 0.03 $\mu$m; but is preferably no greater than 10 $\mu$m, more preferably no greater than 0.5 $\mu$m, and is most preferably 0.1 $\mu$m. The thickness, porosity, and pore size characteristics referred to above refer to measurements taken when the ionomer(s) contained in the layer are in their dry and protonated form.

Thereafter the components of the MEA are assembled by positioning one of the active layers in contact with the solid polymer electrolyte, and then positioning the second active layer so that it is between the first active layer and the porous carbon material, forming the membrane/electrode assembly thereby.

The term "catalytically-active particles" as used herein refers to particles of a metal or compound which is catalytic for the electroreduction of oxygen or electrooxidation of hydrogen or methanol under the pressure and temperature conditions in the fuel cell. Examples of such particles which are useful include particles of platinum, ruthenium, gold, palladium, rhodium, iridium, electroconductive and reduced oxides thereof, and alloys of such materials, either in combination with each other or with other transition metals. The particles may be supported on a suitable material, if desired, such as carbon black. Preferably, the catalytically-active particles are platinum particles supported on carbon, which preferably contain from about 10 percent to about 30 percent by weight of platinum. The size of the catalytically-active particles (on an unsupported basis) is preferably at least 10 Å, more preferably at least 20 Å; but is preferably no greater than 500 Å, more preferably no greater than 200 Å. Larger size particles may also be utilized, or may form during cell operation by the agglomeration of smaller particles. However, the use of such particles may result in decreased cell performance.

The catalytically-active particles are preferably used in an amount sufficient to provide an optimum catalytic effect under the operating conditions of the electrochemical device in which they are employed. Preferably, they are utilized in an amount sufficient to provide a loading level on the cathode side of the membrane of at least 0.05 mg/cm$^2$, more preferably at least 0.1 mg/cm$^2$, and is most preferably at least 0.15 mg/cm$^2$; but is preferably no greater than 0.45 mg/cm$^2$, more preferably no greater than 0.35 mg/cm$^2$, and is most preferably no greater than 0.25 mg/cm$^2$. The loading level on the anode side of the membrane is preferably at least about 0.01 mg/cm$^2$, but no greater than 0.15 mg/cm$^2$. Relative to the amount of ionomer, however, the particles are preferably present in the ink in an amount, based on the weight of the catalytic particles, including their support, if any, sufficient to provide a weight ratio of particles:ionomer of at least 2:1, but preferably no more than 5:1.

As used herein, the term "organic compound" refers to a polar organic compound which is a liquid at a temperature of 50° C. Examples of suitable organic compounds for use in the preparation of the catalyst ink include polar solvents such as propylene glycol methyl ether, dipropylene glycol methyl ether, propylene glycol n-butyl ether, dipropylene glycol n-butyl ether, propylene glycol n-propyl ether, dipropylene glycol n-propyl ether, dipropylene glycol dimethyl ether, diethyl succinate, dimethyl succinate, glycerin, $C_{1-6}$ alcohols, ethylene carbonate, propylene carbonate, butylene carbonate, ethylene carbamate, propylene carbamate, butylene carbamate, acetone, acetonitrile, difluorobenzene, sulfolane, or mixtures thereof. Preferably, the organic compound is propylene glycol methyl ether, dipropylene glycol methyl ether, propylene glycol n-butyl ether, dipropylene glycol n-butyl ether, propylene glycol n-propyl ether, dipropylene glycol n-propyl ether, dipropylene glycol dimethyl ether, diethyl succinate, dimethyl succinate, glycerin, $C_{1-6}$ alcohols, propylene carbonate, or a mixture thereof, but is most preferably propylene carbonate. The organic compound is preferably present in an amount, based on the weight of the composition, of at least 10 percent, more preferably at least 20 percent, and is most preferably at least 30 percent; but is preferably no greater than 90 percent. Such solvents in the ink function primarily as solvents or dispersing aids.

Suitable ionomers for use in the preparation of the catalyst ink include any polymer or oligomer having an ionic conductivity of at least about $1 \times 10^{-3}$ S/cm, more preferably at least about $10^{-1}$ S/cm (under the operating conditions of the fuel cell or electrolytic cell), or which may be reacted with acid or base to generate an oligomer or polymer having ionic conductivity.

Examples of suitable ionomers include fluoropolymers having pendant ion exchange groups, such as sulfonic acid groups in proton or salt form. Examples of such include sulfonic fluoropolymers having fluoropolymer backbones (which is preferably prepared from tetrafluoroethylene) and 1 to 5 carbon atom pendent ion exchange groups attached thereto and terminating in a sulfonyl group are suitable for use in the present invention. Examples of such sulfonic ion exchange group fluoropolymers are illustrated, or example, in U.S. Pat. Nos. 4,578,512; 4,554,112; 4,515,989; 4,478,695; 4,470,889; 4,462,877; 4,417,969; 4,358,545; 4,358,412; 4,337,211; 4,337,137; and 4,330,654.

Preferably, the ionomer has a substantially fluorinated polymer backbone and a recurring pendent group having the formula:

$$—O—(CFR)_a—(CFR')_b—SO_3M \quad (I)$$

wherein: a and b are independently 0 or an integer of 1 to 3; a+b is at least 1; R and R' are independently selected from the group consisting of halogen, perfluoroalkyl, and fluorochloroalkyl; and M is independently selected from hydrogen or an alkali metal.

Other ionomers useful in forming both thick and thin composite membrane layers are characterized by a substantially fluorinated polymer backbone and a recurring pendent group having the formula:

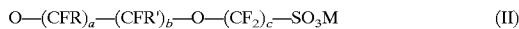

$$O—(CFR)_a—(CFR')_b—O—(CF_2)_c—SO_3M \quad (II)$$

wherein: a and b are independently 0 or an integer of 1 to 3; c is an integer of 1 to 3; a+b is at least 1; R and R' are independently selected from the group consisting of perfluoroalkyl, halogen, and fluorochloroalkyl; and M is independently selected from hydrogen or an alkali metal.

Ionomers having the above formulas are disclosed in U.S. Pat. Nos. 4,478,695; 4,417,969; 4,358,545; 4,940,525; 3,282,875; and 4,329,435. The ionomer is preferably present in an amount, based on the weight of the composition, of at least 0.5 percent but preferably no more than about 5 percent. The ionomer may be utilized in any ionic form, such as the proton form or salt form of the corresponding oligomer or polymer. Examples of salt forms include quaternary ammonium, sodium, lithium, and potassium.

In the first aspect of the invention, the ionomers used to prepare the inks preferably have an equivalent weight, based on the number of pendant ionic groups per molecule, of preferably no greater than 1400, more preferably no greater than 950. However, after the organic solvents and dispersing aids have been removed from the ink, the ionomer must also be substantially insoluble in water at temperatures below 100° C.; therefore, the minimum equivalent weight for certain ionomers(such as ionomers which do not contain any crosslinkable groups) may be higher than the minimum equivalent weight which may be required if the ionomer does contain crosslinkable groups. If the ionomers contains reactive groups which will crosslink to form covalent bonds between polymer chains at temperatures of less than 250° C. (such as, for example, pendant unsaturated groups) to render them substantially insoluble in water, such ionomers preferably have an equivalent weight of at least 100. If the ionomers do not contain any crosslinkable groups, their equivalent weight is preferably at least 600, more preferably at least 700. The term "substantially insoluble in water" as used herein means that the pure ionomer in the ionic form is at least 75 percent insoluble in distilled water at any concentration. The difference between the equivalent weight of the ionomers in at least two of the inks used to prepare the MEA is preferably at least 50, more preferably at least 100, and is most preferably at least 300; but is preferably no greater than 800, more preferably no greater than 600, and is most preferably no greater than 400. In the second and third aspects of the invention, the ionomers used to prepare the ink preferably has an equivalent weight of at least 650, more preferably at least 700, and is most preferably at least 770; but is preferably no greater than 950, more preferably no greater than 900, and is most preferably no greater than 840. The equivalent weight of the ionomer may be determined by any suitable technique, such as titration with a base, as illustrated in U.S. Pat. No. 4,940,525.

Referring now to FIG. 1, a membrane (1) is shown, having two active layers positioned on each side of the membrane. The active layers closest to the membrane (2,3) contain ionomers having lower average equivalent weights than the active layers positioned adjacent thereto (4,5).

Illustrative Embodiments

The following examples are given to illustrate the invention and should not be interpreted as limiting it in any way. Unless stated otherwise, all parts and percentages are given by weight.

EXAMPLE 1

A membrane/electrode assembly is prepared as follows: An ion exchange membrane prepared from perfluorosulfonic acid ionomer having an equivalent weight (EW) of 800, a thickness of 2.4 mil dried and 5 mil fully-hydrated is obtained and cut into sheets 11 cm by 11 cm and placed into a NaOH bath to convert it to the Na+ form. The electrode ink is prepared by mixing 2.03 g of a 3.7 weight percent solution of a perfluorosulfonic acid ionomer having an equivalent weight (EW) of 770 (in a 50:50 volume percent ethanol/water solution), 0.1875 g of 20 weight percent platinum on carbon (available from E-TEK, Natick, Mass.), 0.105 g of tetrabutylammonium hydroxide (TBAOH), and 0.6 g of glycerin. The mixture is agitated with a stir bar overnight or until the mixture is uniformly dispersed. An additional 1.2 g of glycerin is then added to the mixture.

The catalyst ink is painted onto clean, 9 cm² fiberglass blanks coated with polytetrafluoroethylene (CHR Industries, New Haven, Conn.), which have been dried in an oven at 110° C. and pre-weighed. The blanks are painted two more times with the catalyst ink, which are completely dried before the application of the second and third layers. The MEA is formed by aligning a coated blank on each side of the ionomer membrane which has been dried on a vacuum table. The blanks and membrane are placed into a press at 195° C. and pressed at a pressure of 100 pounds per $Cm^2$ of blank for 5 minutes. The press package is allowed to cool to room temperature before opening. The blank is peeled away from the catalyst layer, leaving the film adhered to the surface of the membrane. Platinum loadings and catalyst layer thicknesses are 0.14 $mg/cm^2$ and 5 $\mu$m on the anode side the membrane, 0.25 $mg/cm^2$ and 8 $\mu$m on the cathode side of the membrane, respectively.

Separate intermediate layers (between the MEA and flow field) of a graphite cloth impregnated with a mixture of carbon and polytetrafluoroethylene particles (available as ELAT from E-TEK, Inc., Natick, Mass.) are placed next to both active layers in the cell assembly and are held in place by a polytetrafluoroethylene film (available as Teflon™ from DuPont) gasket and the cell compression. The resulting assemblies are then tested in a test fuel cell prepared by Fuel Cell Technologies, Inc. (Santa Fe, N.Mex.). The flow fields are comprised of solid graphite blocks with machined-in serpentine channels.

Figure 2:
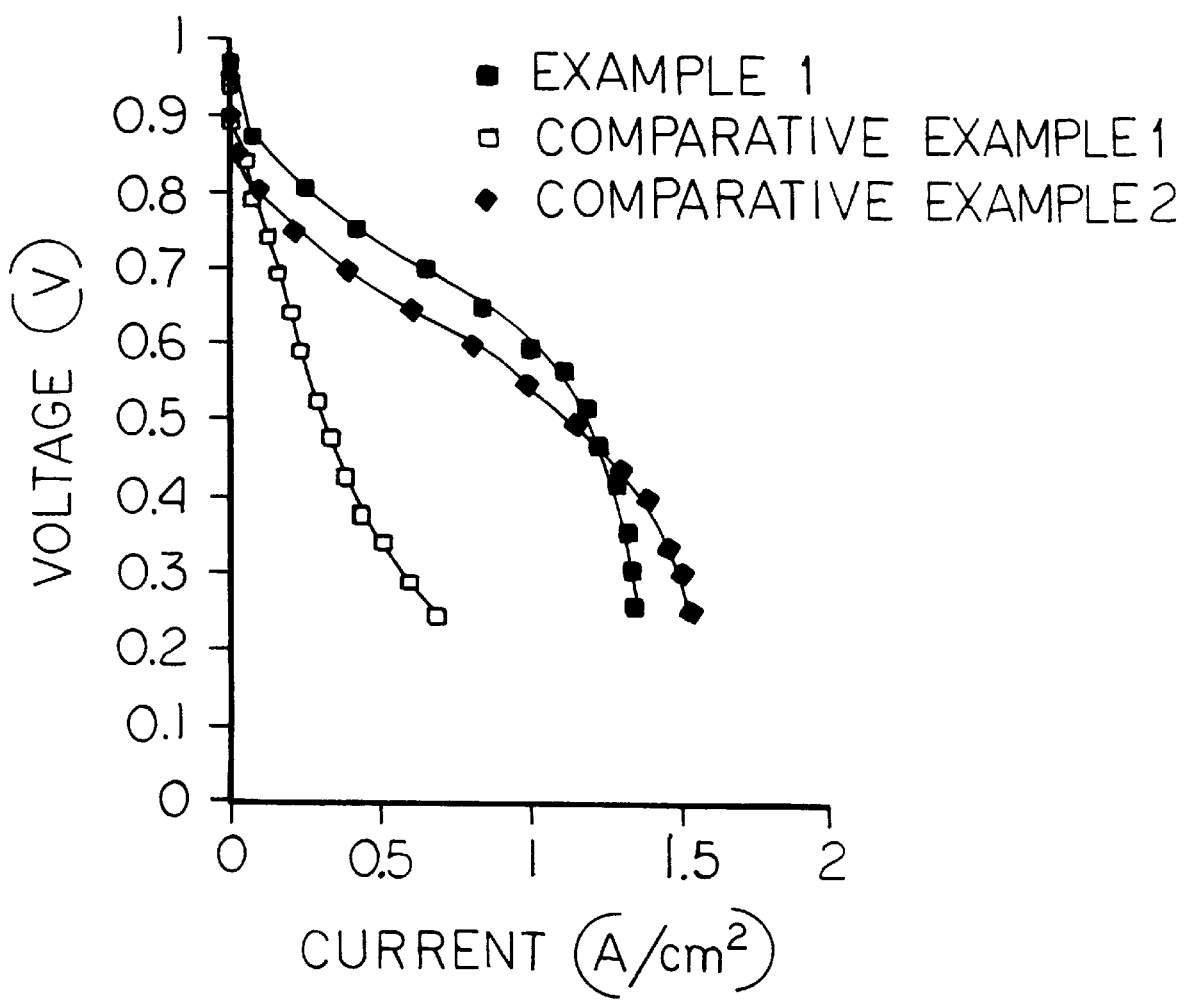
FIG. 2 shows the performance of the membrane electrode assemblies prepared as described in Example 1 and Comparative Examples 1 and 2.

The cell is placed onto a single cell test stand made by Fuel Cell Technologies, Inc. (Sante Fe, N.Mex.). The anode ($H_2$) and cathode (air) flows are held fixed and do not vary with the current density. The flow rates for a given test are defined by specifying a current density. For example, if the anode flow rate of $H_2$ is 2X stoichiometric at 1.0 $Amps/cm^2$ ($A/cm^2$), then the flow rate is twice that which is required to sustain a current density of 1 $A/cm^2$. Thus, when the cell is operating at 0.5 $A/cm^2$, this same flow is 4 times that which is required to sustain the current density. The anode and cathode pressures are held at 20 and 30 psig, respectively. The cell temperature is 80° C. while the external humidifiers are set at 100° C. for the anode and 85° C for the cathode. The cell is preconditioned at 0.5 V load for 12 hours. The performance of the cell is shown in FIG. 2. The anode flow rate of $H_2$ is 2X stoichiometric at 1.0 $A/cm^2$, and the cathode flow rate of air is 3X stoichiometric at 1.0 $A/cm^2$.

Comparative Example 1 (Not an example of the invention)

A membrane/electrode assembly is prepared as described in Example 1, except instead of using a 770 equivalent weight ionomer in the catalyst ink, an ionomer having an equivalent weight of 632 is used. The platinum loadings on the anode and cathode side of the membrane, as well as the resulting thicknesses of the catalyst layer, are the same as described in Example 1. The assembly is tested in a fuel cell as described in Example 1, and the results are shown in FIG. 2.

Comparative Example 2 (Not an example of the invention)

A membrane/electrode assembly is prepared as described in Example 1, except instead of using a 770 equivalent weight ionomer in the catalyst ink, a polytetrafluoroethylene polymer having pendant sulfonic acid groups and an equivalent weight of about 1100, (available as a Nafion™ polymer from Du Pont) is used. The platinum loadings on the anode and cathode side of the membrane, as well as the resulting thicknesses of the catalyst layer, are the same as described in Example 1. The assembly is tested in a fuel cell as described in Example 1, and the results are shown in FIG. 2.

EXAMPLE 2

Membrane and electrode structures are prepared as follows: An ion exchange membrane prepared from perfluorosulfonic acid ionomer having an equivalent weight of 800, a thickness of 2.4 mil (60 $\mu$m) dried and 5 mil (127 $\mu$m) fully hydrated (available from The Dow Chemical Company as XUS 13204.20) is obtained and cut into sheets 11 cm by 1 cm and placed into a NaOH bath to convert it to the Na+ form. An electrode ink is prepared by mixing 1.08 g of a 5.79 weight percent solution of the above ionomer (in a 50:50 volume percent ethanol/water solution), 0.1875 g of 20 weight percent platinum on carbon (available from E-TEK (Natick, Mass.)) and 0.114 g of a 1M solution of tetrabutylammonium hydroxide (TBAOH, a plasticizing agent) in methanol, and 0.6 g of propylene carbonate (dispersing aid). The mixture is agitated with a stir bar overnight or until the mixture is uniformly dispersed. An additional 1.2 g of propylene carbonate is then added to the mixture. The electrode ink is applied to the anode and cathode sides of the membrane according to the procedure described in Example 1. Platinum loadings and catalyst layer thicknesses are 0.15 $mg/cm^2$ and 10 $\mu$m on the anode side the membrane, 0.25 $mg/cm^2$ and 17 $\mu$m on the cathode side of the membrane, respectively.

Figure 3:
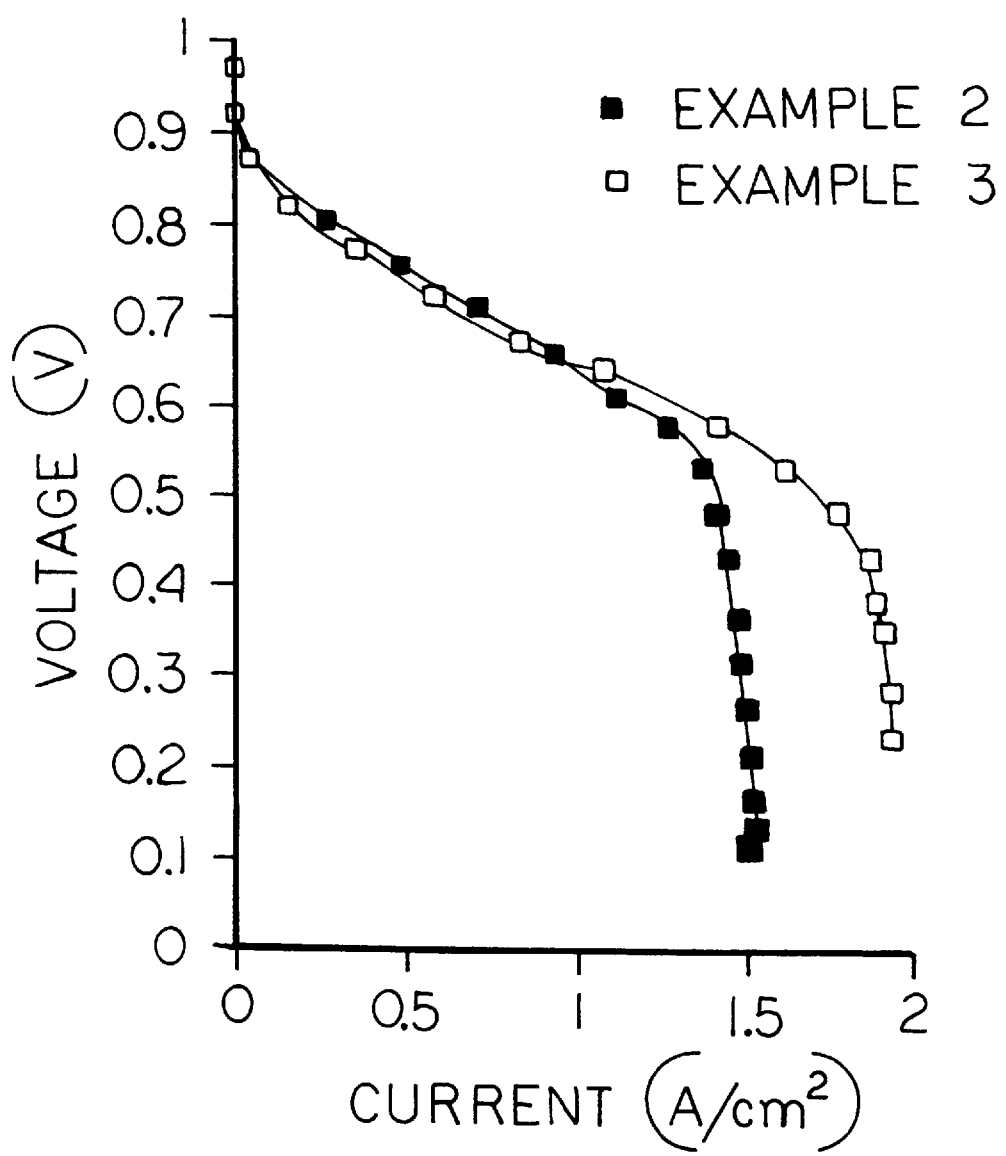
FIG. 3 shows the performance of the membrane electrode assemblies prepared as described in Examples 2 and 3.

A fuel cell is then assembled as described in Example 1, except that no intermediate layers are utilized in the assembly of the cell and the flow fields are as follows: The cathode flow field is carbon paper having a porosity of 90 percent and a thickness of 24 mils (available as Spectracarb™ paper from Spectracorp (Lawrence, Mass.)). The wettability of the paper is increased by oxidation in a medium comprising 0.006M silver sulfate, 0.2M sodium persulfate, and 0.5M sulfuric acid, at a temperature of 60° C. for 1 hour. The anode flow field is carbon paper having a porosity of 79 percent and a thickness of 14 mils. The assembly is tested in a fuel cell as described in Example 1, except that the anode and cathode pressures are held at 20 and 30 psig, respectively, and the cathode flow rate of air is 2X stoichiometric at 1.0 $A/cm^2$. The results are shown in FIG. 3.

EXAMPLE 3

A membrane and electrode structure is prepared as described in Example 1, except that a second electrode ink is utilized in addition to the ink described in Example 1. The second electrode ink is prepared by mixing 1 g of a 5 percent solution of Naflon™ (an 1100 equivalent-weight polytetrafluoroethylene having sulfonic acid groups, available from Du Pont), 0.15 g of carbon-supported platinum containing 20 percent by weight of platinum, and 0.076 g of a 1M solution of tetrabutylammonium hydroxide (TBAOH) in methanol, and 1.2 g of propylene carbonate (a dispersing aid).

The second ink is painted onto the fiberglass blank to be used with the cathode side of the membrane, and allowed to dry completely, followed by an application of the ink described in Example 1. The ink described in Example 1 is applied to the fiberglass blank to be used with the anode side of the membrane. Platinum loadings are 0.14 $mg/cm^2$ on the anode side of the membrane and 0.25 $mg/cm^2$ on the cathode side of the membrane. A fuel cell is assembled and tested as described in Example 1. The performance of the fuel cell is illustrated in FIG. 3.

What is claimed is:

1. A membrane electrode assembly having an ion exchange membrane, and at least two active layers positioned on the same side of the membrane; wherein the active layers comprise catalytically-active particles and an ionomer; the average equivalent weights of the ionomers in the layers differ by at least 50; and the active layer positioned closest to the membrane contains the ionomer with the lower average equivalent weight.

2. The membrane electrode assembly of claim 1 wherein the active layer comprises at least 99 percent by weight of the mixture of catalytically-active particles and the ionomer.

3. The membrane electrode assembly of claim 1 wherein the active layer has a thickness of at least 1 μm.

4. The membrane electrode assembly of claim 1 wherein the active layer has a thickness of at least 5 μm.

5. The membrane electrode assembly of claim 1 wherein the active layer has a thickness of at least 10 μm.

6. The membrane electrode assembly of claim 1 wherein the active layer has a thickness of no greater than 30 μm.

7. The membrane electrode assembly of claim 1 wherein the active layer has a porosity of at least 30 percent.

8. The membrane electrode assembly of claim 1 wherein the active layer has a porosity of at least 50 percent.

9. The membrane electrode assembly of claim 1 wherein the active layer has a mean pore size in the range of from 0.01 μm to 10 μm.

10. The membrane electrode assembly of claim 1 wherein the active layer has a mean pore size in the range of from 0.03 μm to 0.5 μm.

11. The membrane electrode assembly of claim 1, wherein the catalytically active particles are present in an amount sufficient to provide a loading level on the cathode side of the membrane in the range of from 0.05 mg/cm$^2$ to 0.45 mg/cm$^2$, and a loading level on the anode side of the membrane in the range of from 0.01 mg/cm$^2$ to 0.15 mg/cm$^2$.

12. A membrane electrode assembly having an ion exchange membrane, and at least one active layer positioned on one side of the membrane; wherein the active layers comprises (a) catalytically-active particles, and (b) an ionomer having an equivalent weight of at least 650 and less than 950 and which is substantially insoluble in water at a temperature of less than 100° C.

13. The membrane electrode assembly of claim 12 wherein the active layer comprises at least 99 percent by weight of the mixture of catalytically-active particles and the ionomer.

14. The membrane electrode assembly of claim 12 wherein the active layer has a thickness of at least 1 μm.

15. The membrane electrode assembly of claim 12 wherein the active layer has a thickness of at least 5 μm.

16. The membrane electrode assembly of claim 12 wherein the active layer has a thickness of at least 10 μm.

17. The membrane electrode assembly of claim 12 wherein the active layer has a thickness of no greater than 30 μm.

18. The membrane electrode assembly of claim 12 wherein the active layer has a porosity of at least 30 percent.

19. The membrane electrode assembly of claim 12 wherein the active layer has a porosity of at least 50 percent.

20. The membrane electrode assembly of claim 12 wherein the active layer has a mean pore size in the range of from 0.01 μm to 10 μm.

21. The membrane electrode assembly of claim 12 wherein the active layer, has a mean pore size in the range of from 0.03 μm to 0.5 μm.

22. The membrane electrode assembly of claim 12, wherein the catalytically-active particles are present in an amount sufficient to provide a loading level on the cathode side of the membrane in the range of from 0.05 mg/cm$^2$ to 0.45 mg/cm$^2$, and a loading level on the anode side of the membrane in the range of from 0.01 mg/cm$^2$ to 0.15 mg/cm$^2$.

23. A composition comprising (a) catalytically-active particles, (b) an organic compound, and (c) an ionomer having an equivalent weight of at least 650 and less than 950 and which, after removal of component (b) from the composition, is substantially insoluble in water at a temperature of less than 100° C.

24. The composition of claim 23 wherein the organic compound is selected from the group consisting of propylene glycol methyl ether, dipropylene glycol methyl ether, propylene glycol n-butyl ether, dipropylene glycol n-butyl ether, propylene glycol n-propyl ether, dipropylene glycol n-propyl ether, dipropylene glycol dimethyl ether, diethyl succinate, dimethyl succinate, glycerin, $C_{1-6}$ alcohols, propylene carbonate, and mixtures thereof.

25. The composition of claim 23 wherein the organic compound is propylene carbonate.

* * * * *